US009195627B2

United States Patent
Chen et al.

(10) Patent No.: US 9,195,627 B2
(45) Date of Patent: Nov. 24, 2015

(54) APPARATUS AND METHOD OF CONTROLLING CLOCK SIGNALS (71) Applicant: ACCTON TECHNOLOGY CORPORATION, Hsinchu (TW)

(72) Inventors: Chi-Hsu Chen, Changhua County (TW); Yi-Liang Yeh, Taitung County (TW); Yu-Yun Lee, Hsinchu County (TW); Yuan-Hsiung Sung, Taichung (TW); Kuo-Jui Yu, Taichung (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 304 days.

(21) Appl. No.: 13/946,048

(22) Filed: Jul. 19, 2013

(65) Prior Publication Data

US 2014/0136875 A1    May 15, 2014

(30) Foreign Application Priority Data

Nov. 13, 2012  (TW) .............................. 101142212 A (51) Int. Cl.
  *G06F 1/04*  (2006.01)
  *G06F 13/42*  (2006.01)
(52) U.S. Cl.
  CPC .................................. *G06F 13/4291* (2013.01)
(58) Field of Classification Search
  CPC ...................................... G06F 1/04; G06F 1/08
  USPC ............................................ 713/500, 600, 401
  See application file for complete search history.

(56) References Cited

U.S. PATENT DOCUMENTS

| 5,878,234 | A | 3/1999 | Dutkiewicz et al. | |
| 6,182,175 | B1 * | 1/2001 | Nihouran | 710/105 |
| 7,069,476 | B1 * | 6/2006 | Insley et al. | 714/43 |
| 7,509,446 | B2 | 3/2009 | Hayashita | |
| 7,605,617 | B2 * | 10/2009 | Lepek | 327/99 |
| 7,668,995 | B2 | 2/2010 | Hayashita | |
| 2009/0113097 | A1 * | 4/2009 | Drerup et al. | 710/110 |
| 2009/0182921 | A1 * | 7/2009 | Lin et al. | 710/110 |
| 2009/0193165 | A1 * | 7/2009 | Hsieh et al. | 710/110 |
| 2010/0223486 | A1 | 9/2010 | Deshpande | |

(Continued)

FOREIGN PATENT DOCUMENTS

| CN | 102298564 A | 12/2011 |
| CN | 102541783 A | 7/2012 |

(Continued)

OTHER PUBLICATIONS

Taiwan Patent Office "Office Action" issued on Apr. 27, 2015.

*Primary Examiner* — Chun Cao
(74) *Attorney, Agent, or Firm* — WPAT, PC; Justin King (57) ABSTRACT

An apparatus and a method of controlling clock signals for a master device and a slave device are disclosed. The controlling apparatus includes: a first connection port coupled to a first clock line of the master device; a second connection port coupled to a second clock line of the slave device; and a control module receiving a first clock signal from the master device via the first connection port, producing a second clock signal according to the first clock signal, and transmitting the second clock signal to the slave device via the second connection port; wherein when the first clock signal is switched from a first logic level to a second logic level, the control module controls the first connection port to maintain the second logic level in a time interval.

12 Claims, 8 Drawing Sheets

(56) References Cited

U.S. PATENT DOCUMENTS

2011/0161545 A1* 6/2011 Chang et al. .................. 710/305
2012/0275454 A1* 11/2012 Chen et al. .................... 370/389

FOREIGN PATENT DOCUMENTS

TW  200839529 A  10/2008
TW  200921398 A  5/2009

* cited by examiner

APPARATUS AND METHOD OF CONTROLLING CLOCK SIGNALS

This application claims the benefit of Taiwan application Serial No. 101142212, filed Nov. 13, 2012, the disclosure of which is incorporated by reference herein in its entirety.

TECHNICAL FIELD

The present disclosure relates to a control apparatus and the controlling method thereof, and more particularly, to a control apparatus and the controlling method thereof for clock signal.

TECHNICAL BACKGROUND

Common interfaces of serial bus utilize clock signals by two signal control lines, serial data line (SDA) and serial clock line (SCL), to connect master and slave devices and perform the data transmission between the multiple integrated circuits or chips. $I^2C$ (inter-integrated circuit) connection is an example of the interfaces. Conventionally, the master and slave devices in the $I^2C$ system can control the level of the clock line that connected to the master and slave device directly to produce the clock signals with high/low level and perform synchronous clock controlling of data communication between the master and slave device. However, some electronic devices like an electrically erasable programmable read-only memory (EEPROM) are limited to the number of available addresses. The limitation leads that the addresses may be insufficient to support the system including a plurality of the electronic device as the slave devices, and causes failures such as double addressing or address conflict. To deal with this problem, a switching device was used to switch the connection between the master and slave devices, but an additional device, the switching device, brings about a burden of cost and a much complex design of circuit. Moreover, if the switching device is added between the master and slave devices, the clock controlling may fail to be synchronous between the master and slave devices.

The reason why the asynchronization occurs between the master and slave devices is that original direct connection of the clock line between the master and slave devices is interrupted by the participation of the switching device. The interruption causes that the master device cannot distinguish if the slave device is in service or not via the clock line directly. So, it is in need to develop a new control method for the clock signals.

TECHNICAL SUMMARY

According to one aspect of the present disclosure, one embodiment provides a controlling apparatus for a master device and a slave device, which includes: a first connection port coupled to a first clock line of the master device; a second connection port coupled to a second clock line of the slave device; and a control module receiving a first clock signal from the master device via the first connection port, producing a second clock signal according to the first clock signal, and transmitting the second clock signal to the slave device via the second connection port; wherein when the first clock signal is switched from a first logic level to a second logic level, the control module controls the first connection port to retain the second logic level in a time interval.

According to another aspect of the present disclosure, another embodiment provides a controlling method for a master device and a slave device, which includes steps of: receiving a first clock signal from the master device via a first connection port by a control module; letting the control module producing a second clock signal according to the first clock signal and transmitting the second clock signal to the slave device via the second connection port by the control module; monitoring the first connection port by the control module, when the first clock signal is switched from a first logic level to a second logic level, the control module controls the first connection port to retain the second logic level; and stopping controlling the first connection port and returning the first connection port to the first logic level after a time interval by the control module.

Generally, most electronic products or apparatuses use control devices to perform arithmetic, logical, and controlling operations. The control devices can be a complex programmable logic device (CPLD), a field programmable gate array (FPGA), or a micro-processor. This disclosure takes advantage of these existing control devices to control the clock signals of master and slave devices in the interface system of serial bus; thus, additional switching devices can be saved. Also, the controlling method in the embodiments can solve the possible asynchronization of clock controlling due to the added control apparatus.

Further scope of applicability of the present application will become more apparent from the detailed description given hereinafter. However, it should be understood that the detailed description and specific examples, while indicating exemplary embodiments of the disclosure, are given via illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given via illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings. In the following description of the embodiments, it is to be understood that the terms "first", "second" and "third" are used to describe various elements, these elements should not be limited by the term. Also, unless otherwise defined, all terms are intended to have the same meaning as commonly understood by one of ordinary skill in the art.

Figure 1:
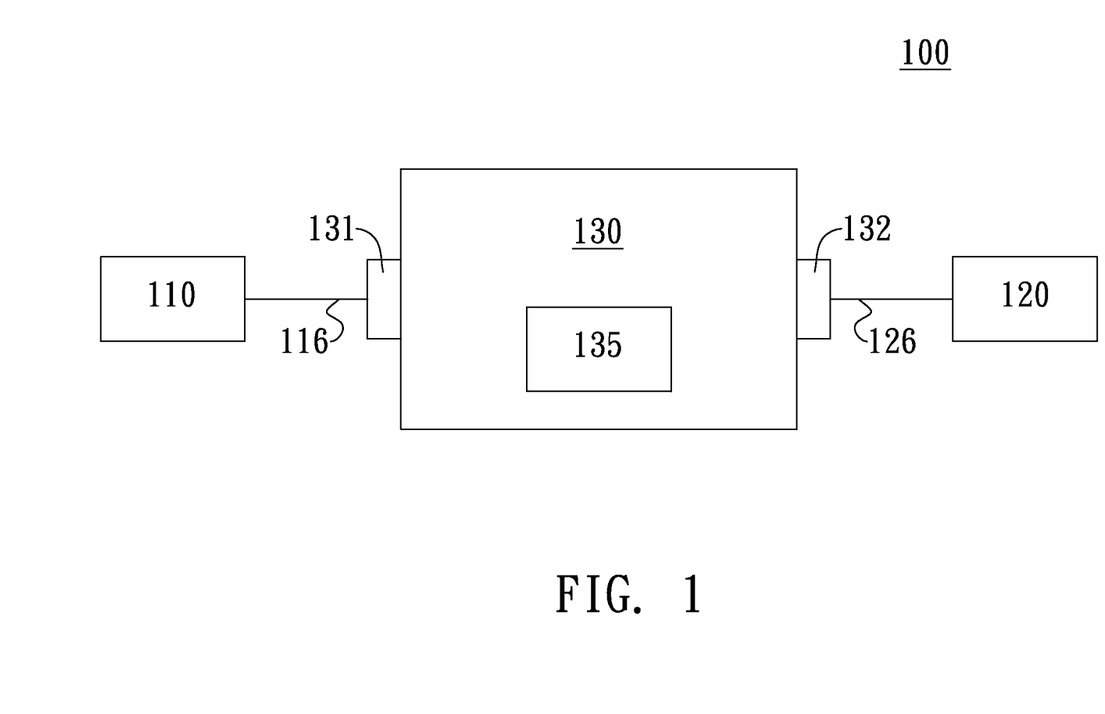
FIG. 1 schematically shows a block diagram of a controlling apparatus for the $I^2C$ system according to a first embodiment of the present disclosure.

FIG. 1 schematically shows a block diagram of a controlling apparatus 130 for an I$^2$C (inter-integrated circuit) system 100 according to a first embodiment of the present disclosure. The I$^2$C system 100 includes a master device 110 and a slave device 120. The controlling apparatus 130 includes a first connection port 131, a second connection port 132, and a control module 135; wherein the first connection port 131 is coupled to the master device 110 via a first clock line 116, and the second connection port 132 is coupled to the slave device 120 via a second clock line 126. Thereby, the controlling apparatus 130 can be applied between the master device 110 and the slave device 120 of the I$^2$C system 100. The first clock line 116 and the second clock line 126 are serial clock lines (SCL) for the master device 110 and the slave device 120, respectively, in the I$^2$C system 100. As to connection of serial data lines (SDA) of the master device 110 and the slave device 120, it is not limited in this disclosure. Moreover, the controlling apparatus 130 may be realized by means of a micro-controller or a programmable logic device such as CPLD or FPGA. Wherein, the first connection port 131 and the second connection port 132 may correspond to the input or output ports of the micro-controller or programmable logic device, and the control module 135 may correspond to the arithmetic-logic unit (ALU) or other module that performs arithmetic, logical, and controlling operations in the micro-controller or programmable logic device; but is not limited thereto in this disclosure.

Referring to FIG. 1, when a first clock signal (not shown) is transmitted from the master device 110, the control module 135 receives the first clock signal via the first clock line 116 and the first connection port 131, and then processes the clock signal to produce a second clock signal (not shown) according to the received first clock signal. This will be described in detail later. Then the control module 135 sends out the second clock signal to the slave device 120 via the second connection port 132 and the second clock line 126.

To prevent the master device 110 and the slave device 120 from synchronization failure in the I$^2$C system 100, the controlling apparatus 130 is used in the embodiment to prolong the logic low level of the first clock signal for the master device 110 compulsively, so that the processed clock signal of the master device 110 may be applicable to different slave devices whose clock periods may be different from each other. Thus, when the received first clock signal at the first connection port 131 is switched from a logic high level to the logic low level, the control module 135 may control the first connection port 131 to maintain the logic low level for a time interval, so as to prolong the logic low level in the SCL of the master device 110. This gives that the slave device 120 has a sufficient time to work without being asynchronous from the master device 110.

Figure 2:
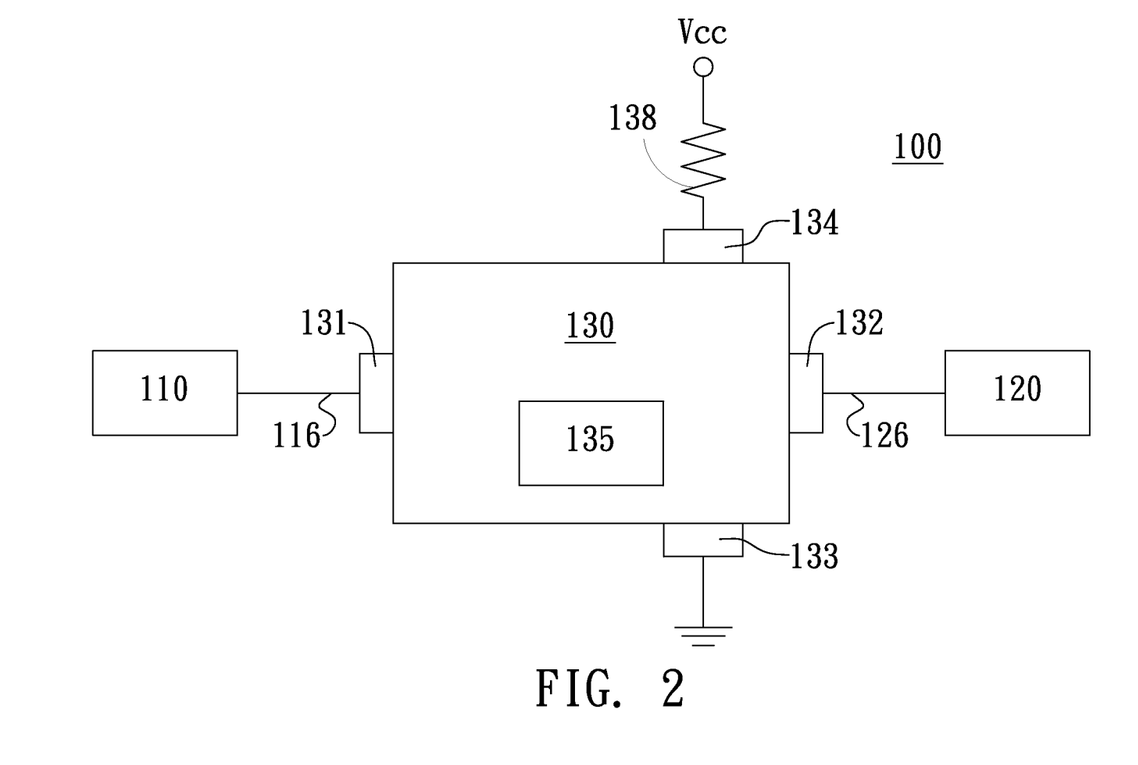
FIG. 2 schematically shows another block diagram of a controlling apparatus for the $I^2C$ system according to the embodiment of the present disclosure.

To prolong the logic low level at the first connection port 131, two examples are provided below. In the first example, the control module 135 may alter the setting or configuration of the first connection port 131, which can be an input or output port of the control module 135 aforesaid. For instance, the control module 135 may set the first connection port 131 being an output port, and then set the output of the first connection port 131 being a logic low-level signal (not shown). On the other hand, the second example is to ground the first connection port 131 directly. As shown in FIG. 2, the controlling apparatus 130 may further include a ground port 133, and the control module 135 connects the first connection port 131 to the ground port 133 to maintain the logic low level at the first connection port 131 compulsively. It should be noted that the connection between the first connection port 131 and the ground port 133 can be controlled by the controlling apparatus 130 itself directly; for instance, a CPLD as the controlling apparatus 130 may connect its output-port pin to its ground pin directly. Alternatively, an additional circuit outside the controlling apparatus 130 can be used to control the connection between the first connection port 131 and the ground port 133; but is not limited thereto in this disclosure.

Regarding the time interval the logic low level retained at the first connection port 131, it can be a predetermined duration of invariant interval, or it can be adjusted dynamically according to the status of the slave devices 120. If the retaining time interval is invariant, the control module 135 can set the predetermined duration directly by software programming or firmware, to control the logic low level being retained at the first connection port 131 in the predetermined duration. As to the dynamic adjustment mode for the time interval, it will be explained in detail later.

In this embodiment, after receiving the first clock signal from the master device 110 via the first connection port 131, the control module 135 performs clock signal processing to produce the second clock signal according to the first clock signal, and then sends out the second clock signal to the slave device 120 via the second connection port 132. Nevertheless, a switching apparatus used in the prior art may transmit the first clock signal directly to the slave device, without any alteration or process imposed on the first clock signal. To generate the second clock signal for the slave device 120, two ways are provided in the embodiment. In the first way, the control module 135 may directly write the output signal which has been designed to be the second clock signal to the second connection port 132, so that the second clock signal can be set to be a logic low-level or logic high-level signal. Wherein, the logic low-level signal can be a logic "0" signal (or the ground voltage level in this embodiment) and the logic high-level signal can be a logic "1" signal (or the power supply voltage Vcc level in this embodiment); but is not limited thereto in this disclosure.

In the second way as shown in FIG. 2, to produce a logic low-level signal as the second clock signal, the control module 135 may connect the second connection port 132 to the ground port 133, to output a logic low-level signal of the second clock signal. Also, to produce a logic high-level signal, the controlling apparatus 130 may further include a high-level bias port 134 which is coupled to a DC voltage Vcc via a pull-up impedance 138, and the control module 135 may connect the second connection port 132 to the high-level bias port 134, to output a logic high-level signal of the second clock signal. It should be noticed that controlling of the connection between pins of the controlling apparatus 130 (CPLD as an example) can be referred to the foregoing description and not described redundantly here. Accordingly, generation of the logic low-level and logic high-level signals can be realized by means of the first way, the second way, or combination of the first and second ways. For example, the logic high-level signal can be produced by the first way, for example, by signal setting and the logic low-level signal can be produced by the second way, for example, by grounding; but is not limited thereto in this disclosure.

In the case that the controlling apparatus 130 includes both a ground port 133 and a high-level bias port 134 as shown in FIG. 2, prolongation of the time interval, in which the logic low level is retained at the first connection port 131, can be adjusted dynamically. When the first clock signal received by the first connection port 131 is switched from the logic high level to the logic low level, the control module 135 may connect the second connection port 132 to the ground port 133, to output a logic low-level signal as the second clock signal correspondingly. At this phase, the second clock line 126 is under control of the slave device 120, in other word, the second clock line 126 is maintained the logic low level by the slave device 120. Then the control module 135 switches the connection of the second connection port 132 from the ground port 133 to the high-level bias port 134 and monitor the second connection port 132. If the slave device 120 is still in service, the slave device 120 can keep the second clock line 126 retained in the logic low level. The slave device 120 would stop the control over the second clock line 126 until the slave device 120 is out of service. In such a situation, the state of the second connection port 132 may be recovered from the logic low level and return to the logic high level, due to its connection to the high-level bias port 134. Then the control module 135 stops controlling the first connection port 131, so that the time interval in which the logic low level is retained at the first connection port 131 can be adjusted dynamically according to the operational duration of the slave device 120.

Figure 3:
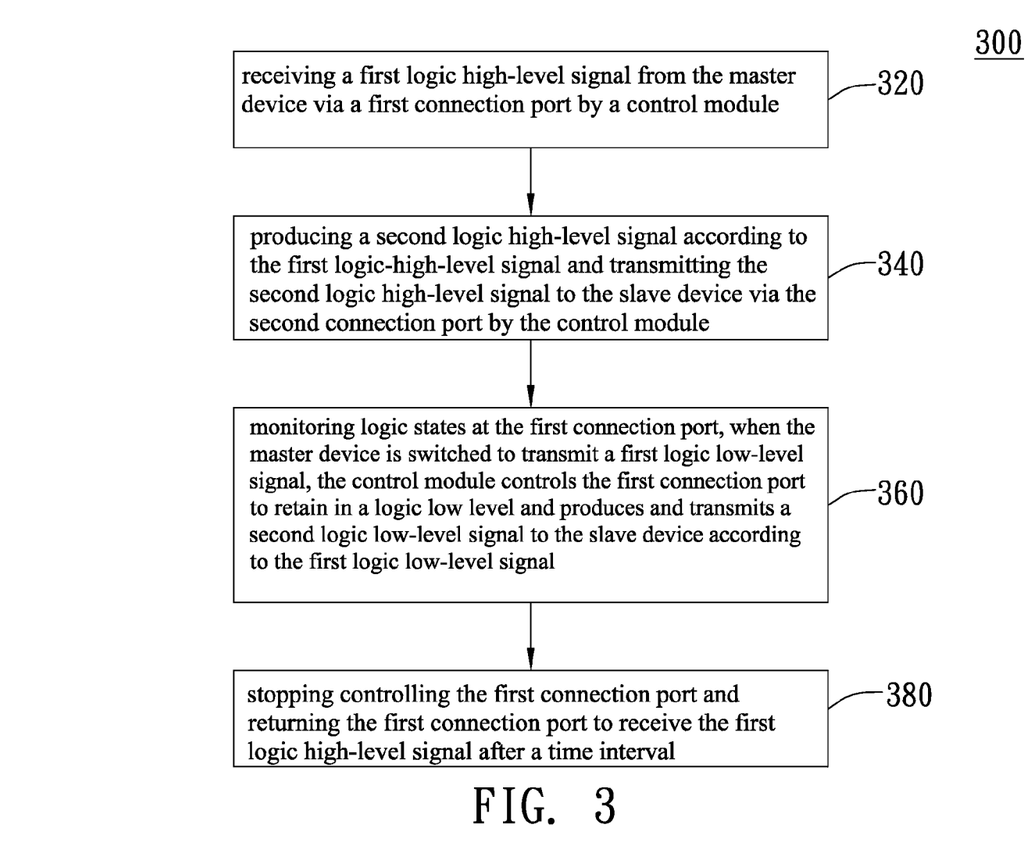
FIG. 3 schematically shows a flow chart of a controlling method for clock signals according to a second embodiment of the present disclosure.

FIG. 3 schematically shows a flow chart of a controlling method 300 for clock signals according to a second embodiment of the present disclosure. The controlling method 300 may be used to control clock signals between master and slave devices in the I²C system. The controlling method 300 includes the steps of: (Step 320) receiving a first logic high-level signal from the master device via a first connection port by a control module; (Step 340) producing a second logic high-level signal according to the first logic-high-level signal and transmitting the second logic high-level signal to the slave device via the second connection port by the control module; (Step 360) monitoring logic states at the first connection port, when the master device is switched to transmit a first logic low-level signal, the control module controls the first connection port to retain in a logic low level and produces and transmits a second logic low-level signal to the slave device according to the first logic low-level signal; (Step 380) stopping controlling the first connection port and returning the first connection port to receive the first logic high-level signal after a time interval.

Figure 4:
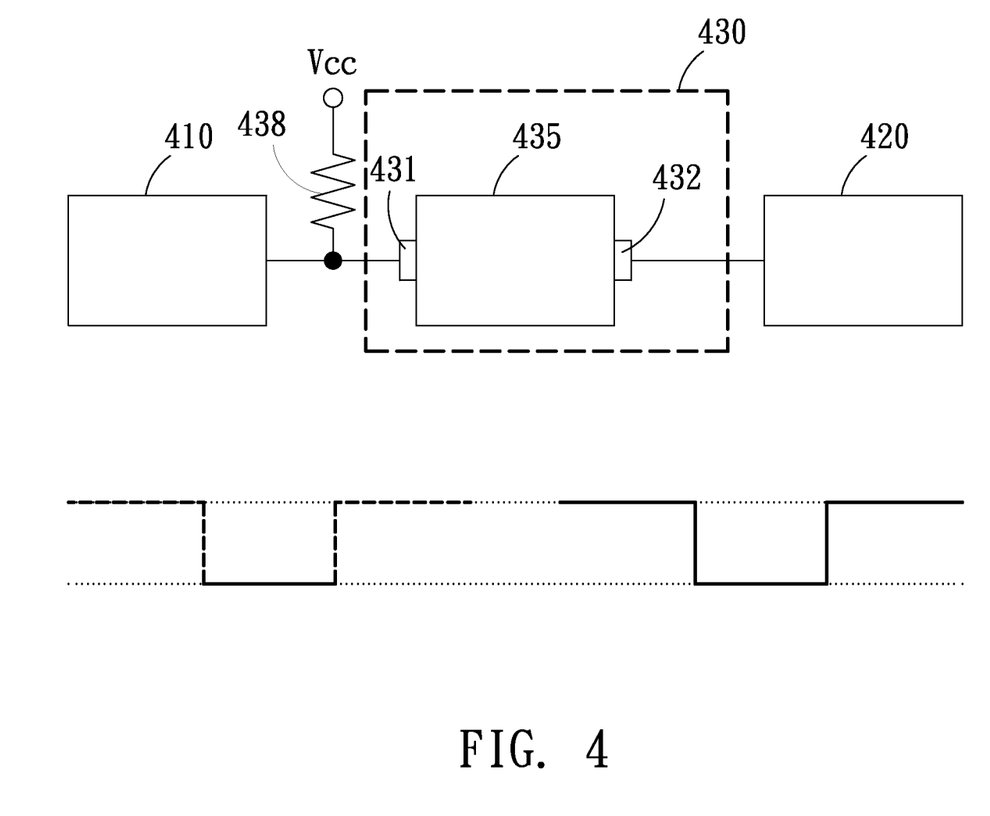
FIG. 4 schematically shows a block diagram of a controlling apparatus for the $I^2C$ system having a master device and a slave device, with timing diagrams illustrating its clock signals plotted in the lower part.

To explain the controlling method 300 of the embodiment in more detail, FIG. 4 schematically shows a block diagram of a controlling apparatus 430 for the I²C system having a master device 410 and a slave device 420, with timing diagrams illustrating its clock signals plotted in the lower part. In the embodiment, a first connection port 431, a second connection port 432, and a control module 435 are included in the controlling apparatus 430, and the controlling method 300 is applied to control the clock signals. The left timing diagram represents the clock signal at the first connection port 431, while the right one represents the clock signal at the second connection port 432; wherein the solid lines denote that the clock signal is under control of the control module 435 at that time, while the dashed lines denote that the clock signal is under control of the master device 410 at that time. As shown in FIG. 4, it is assumed that the clock signal transmitted by the master device 410 is in a logic high level in the beginning. When the control module 435 receives a logic high-level signal (or the first logic high-level signal as recited in Step 320) via the first connection port 431, it may produce a second logic high-level signal accordingly and transmit the second logic high-level signal to the slave device 420 via the second connection port 432, as recited in Step 340. Then, when the clock signal from the master device 410 is switched to a logic low level, the control module 435 can detect such a change (the first logic low-level signal transmitted by the master device 410, as recited in Step 360) in logic level at the first connection port 431, and it maintains the logic low level at the first connection port 431 for a time interval. Concurrently, the control module 435 may produce the second logic low-level signal and transmit it to the slave device 420, as recited in Step 360. After the time interval, the control module 435 may stop controlling the first connection port 431, and the first connection port 431 returned from low level to high level (that is, the control module stop controlling the first connection port after the time interval as recited in Step 380), and recover the status of the clock signals in the I²C system as in the beginning.

In the I²C system, the master device 410 may generate its clock signal by means of connection to a DC voltage Vcc via a pull-up impedance 438 to get a logic high level and to a ground terminal to get a logic low level; but is not limited thereto in this disclosure. Thereby, the retaining duration in which the clock signal is in the logic low level due to grounding can be controlled by the control module 435. In such a situation, the clock line is under the control of the control module 435, so that the clock signal therein can be retained in the logic low level, even if the clock line and the ground terminal are disconnected by the master device 410.

In the embodiment, the control module 435 may perform signal processing onto the clock signal from the master device 410, and may accordingly produce and transmit another clock signal to the slave device 420. Generation of the clock signal of either logic high-level signal or logic low-level signal for the slave device 420 can be referred to the foregoing description and not described redundantly here. Also, prolongation or retaining of the logic low level for the clock signal of the master device 410 can be referred to the foregoing description and not described redundantly here. Regarding the time interval the logic low level is retained by the control module 435 for the master device 410, it can be a predetermined duration of invariant interval. This can be referred to the foregoing description and not described redundantly here.

Figure 5A:
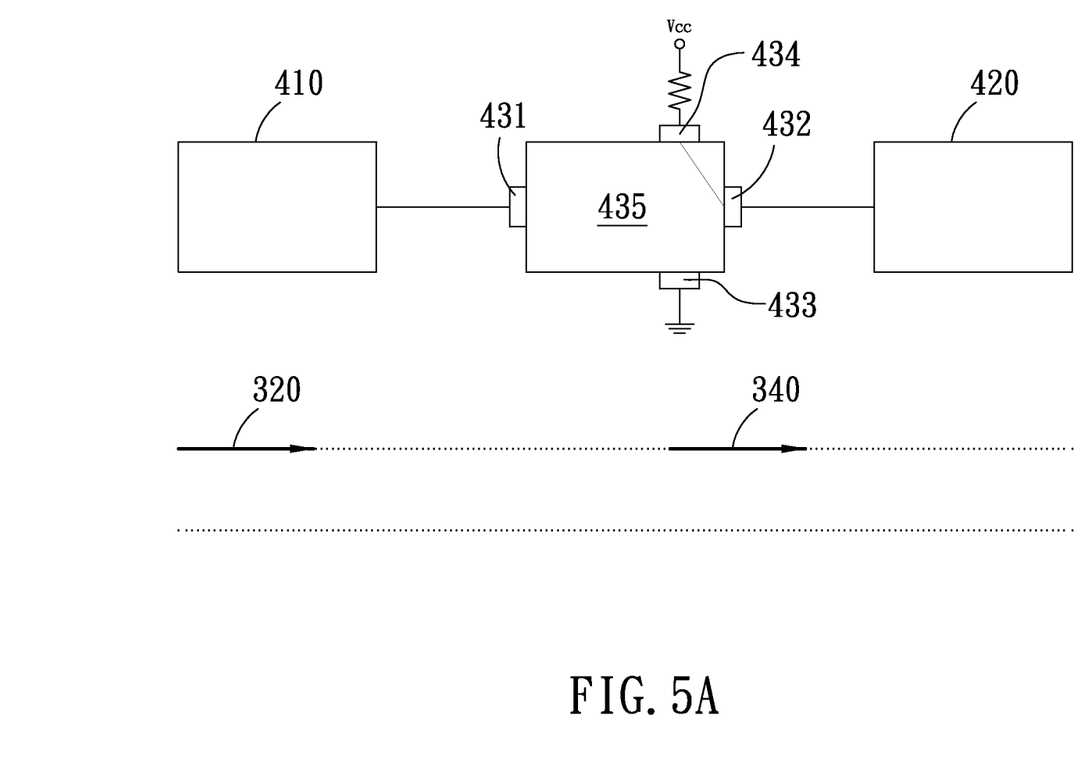
FIGS. 5A to 5D schematically show operational procedure of the embodiment, each figure includes a block diagram of the controlling apparatus for the $I^2C$ system having a master device and a slave device, with timing diagrams illustrating its clock signals plotted in the lower part.
Figure 5B:
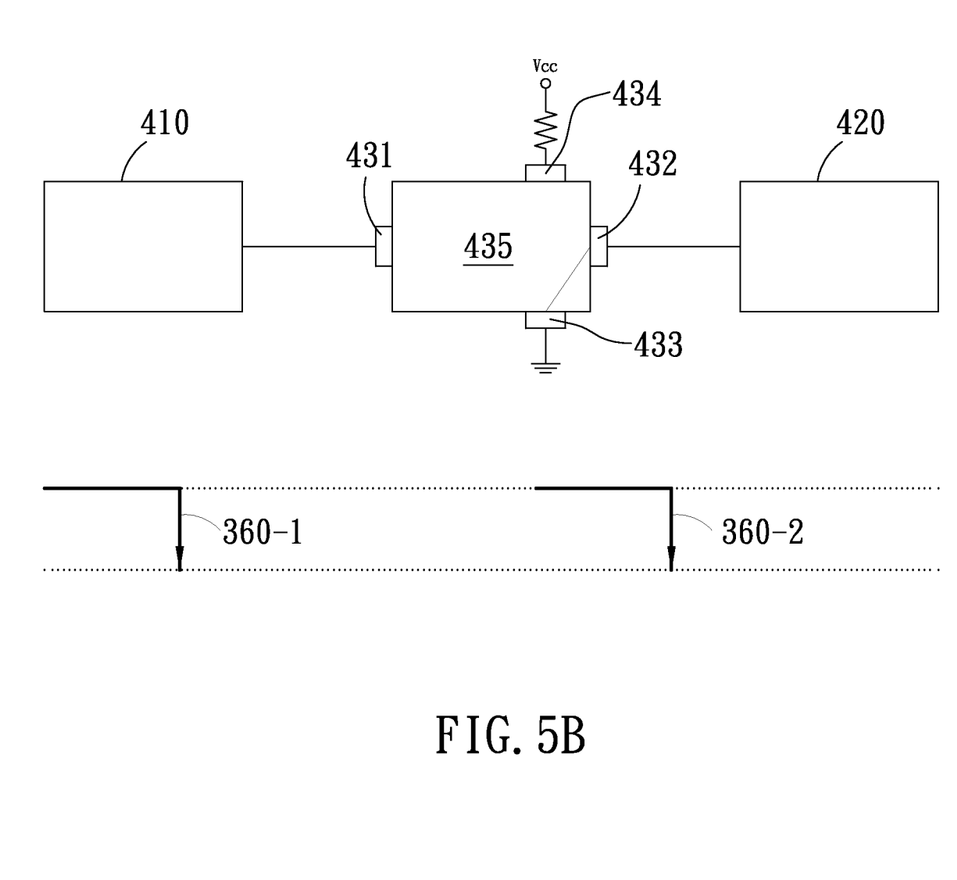
Figure 5C:
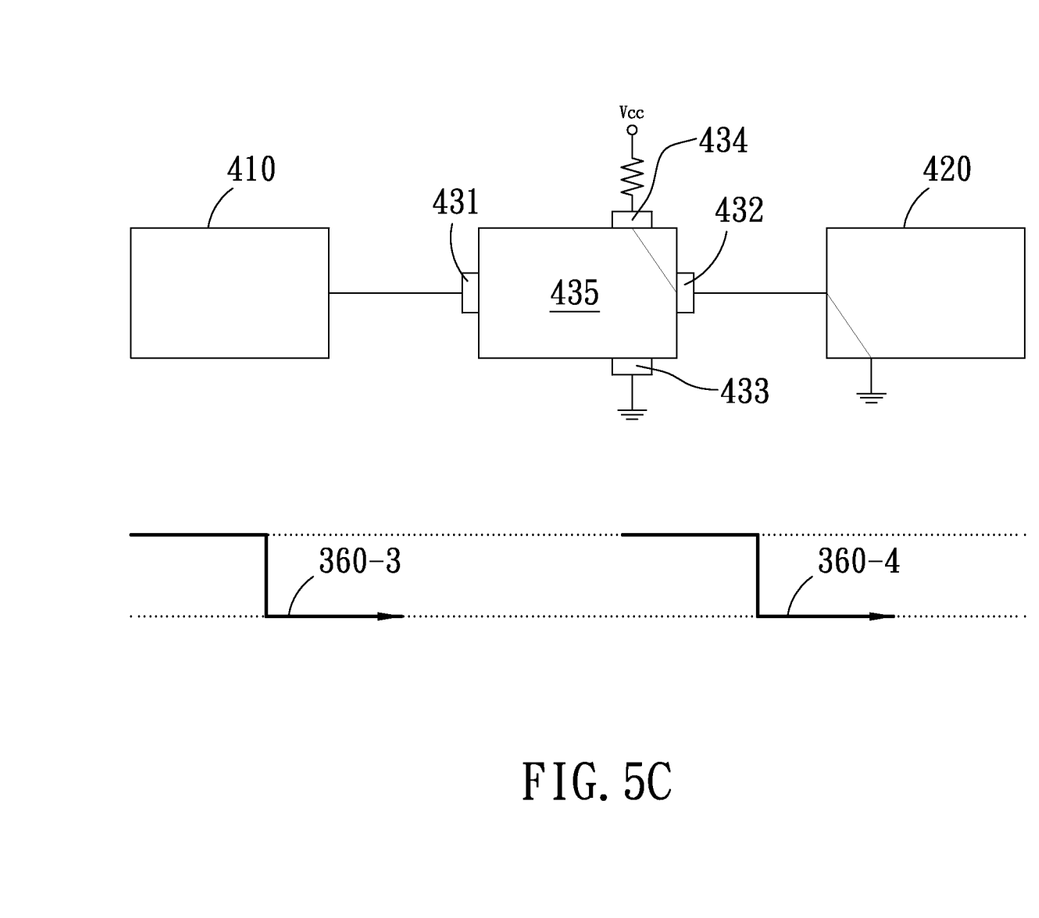
Figure 5D:
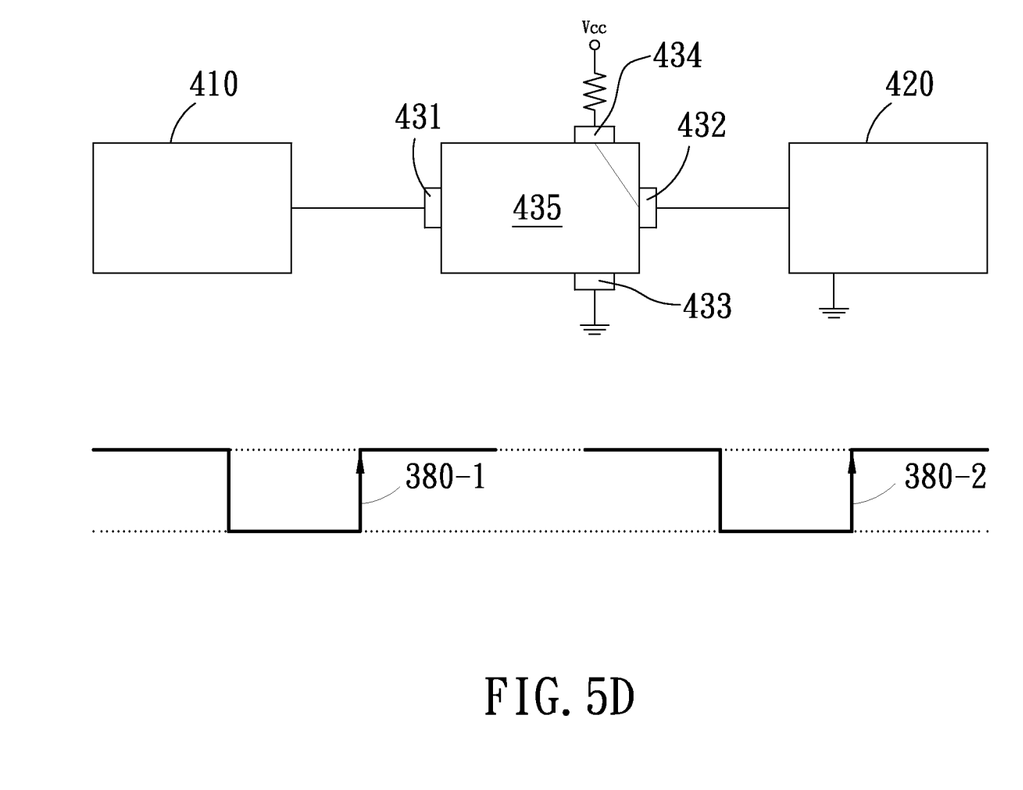

In the case that the controlling apparatus 430 includes both a ground port 433 and a high-level bias port 434 as shown in FIG. 5A, the time interval of prolongation can be adjusted dynamically. FIGS. 5A to 5D schematically show operational procedure of this embodiment, each figure includes a block diagram of the controlling apparatus 430 for the I²C system having a master device 410 and a slave device 420, with timing diagrams illustrating its clock signals plotted in the lower part. In the embodiment, the controlling apparatus 430 includes a control module 435, a first connection port 431, a second connection port 432, a ground port 433 and a high-level bias port 434, and the controlling method 300 is applied to control operations of the clock signals. The left timing diagram represents the clock signal at the first connection port 431, while the right one represents the clock signal at the second connection port 432. In the beginning, the master device 410 sends out a logic high-level clock signal (Step 320, and labeled as 320 in FIG. 5A), as shown in FIG. 5A. Once the control module 435 receives the logic high-level signal via the first connection port 431, it may connect the second connection port 432 to the high-level bias port 434, so as to produce another logic high-level signal and transmit it to the slave device 420 via the second connection port 432 (Step 340, and labeled as 340 in FIG. 5A). As shown in FIG. 5B, when the clock signal from the master device 410 is switched to a logic low level (the first sub-step of Step 360, and labeled as 360-1 in FIG. 5B), the control module 435 can detect such a change in logic state at the first connection port 431, and it switches the connection of the second connection port 432 from the high-level bias port 434 to the ground port 433, so as to produce a logic-low-level signal and transmit it to the slave device 420 (the second sub-step of Step 360, and labeled as 360-2 in FIG. 5B). Then as shown in FIG. 5C, the control module 435 retains the logic low level at the first connection port 431 (the third sub-step of Step 360, and labeled as 360-3 in FIG. 5C). At this phase, the logic level of the clock line between the control module 435 and the slave device 420 is set to be in the logic low level, by means of grounding and according to the I²C specification. Then the control module 435 may switch the second connection port 432 to the high-level bias port 434, and then monitor the logic level at the second connection port 432. (the fourth sub-step of Step 360, and labeled as 360-4 in FIG. 5C) As shown in FIG. 5D, after the slave device 420 stops its control over the clock line (the first sub-step of Step 380, and labeled as 380-1 in FIG. 5D), the logic level of the second connection port 432 can be recovered to the logic high level (the second sub-step of Step 380, and labeled as 380-2 in FIG. 5D). Detecting the logic-level change at the second connection port 432, the control module 435 would stop controlling the first connection port 431, so that the logic level of the first connection port 431 can be recovered to the logic high level (also labeled as 380-1 in FIG. 5D). Thus, the time interval in which the logic low level is retained at the first connection port 431 can be adjusted dynamically, by means of monitoring the logic level at the second connection port 432.

In the embodiments, the control apparatus controls both the master device and the slave device in a serial bus interface. This may save the additional switching devices and the addressing failure due to insufficient addresses for slave devices to be avoided. In the embodiments, the control method is based on the setting and controlling of prolongation interval of logic level in the clock lines. It can be used to solve the asynchronization of clock controlling that may be induced due to an additional control apparatus added.

As set forth in the embodiments, this disclosure is explained according to its application in the I²C system of serial bus interface, in which the clock signal is switched from its logic high level (the first logic level in the embodiments) to its logic low level (the second logic level in the embodiments); but is not limited thereto in this disclosure. The embodiments can be revised properly to be applied to a serial bus interface of the other connection protocol or specification. Accordingly, the embodiments, controlling clock signals according to the logic level, are applicable to the case in which the clock signal is switched from its logic low level to its logic high level, or to the communication beyond the I²C system.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A controlling apparatus for a master device and a slave device comprising:
   a first connection port coupled to a first clock line of the master device;
   a second connection port coupled to a second clock line of the slave device;
   a control module receiving a first clock signal from the master device via the first connection port, producing a second clock signal according to the first clock signal, and transmitting the second clock signal to the slave device via the second connection port;
   a ground port; and
   a high-level bias port, coupled to a voltage source via a pull-up impedance;
   wherein when the first clock signal is switched from a first logic level to a second logic level, the control module controls the first connection port to maintain the second logic level in a time interval, and the control module connects the first connection port to the ground port or the high-level bias port to maintain the second logic level.

2. The controlling apparatus according to claim 1, wherein the control module sets the first connection port as an output port that outputs a second logic signal to maintain the second logic level.

3. The controlling apparatus according to claim 1, wherein the control module produces the second clock signal by setting the second clock signal as a first logic signal or a second logic signal.

4. The controlling apparatus according to claim 1, wherein the control module controls the first connection port to maintain the second logic level in the time interval which is a predetermined duration.

5. A controlling apparatus for a master device and a slave device comprising:
   a first connection port coupled to a first clock line of the master device;
   a second connection port coupled to a second clock line of the slave device;
   a control module receiving a first clock signal from the master device via the first connection port, producing a second clock signal according to the first clock signal, and transmitting the second clock signal to the slave device via the second connection port;
   a ground port; and
   a high-level port coupled to a voltage source via a pull-up impedance;
   wherein when the first clock signal is switched from a first logic level to a second logic level, the control module controls the first connection port to maintain the second logic level in a time interval; the control module connects the second connection port to the ground port or the high-level bias port to produce the second clock signal.

6. The controlling apparatus according to claim 5, wherein the first logic level is a logic high level, the second logic level is a logic low level, the control module produces a logic low-level signal of the second clock signal correspondingly by connecting the second connection port to the ground port, and the control module further switches the connection of the second connection port to the high-level bias port; when the second connection port is switched from the logic low level to the logic high level, the control module stops controlling the first connection port.

7. A controlling method for a master device and a slave device comprising steps of:
   (A) receiving a first clock signal from the master device via a first connection port by a control module;
   (B) producing a second clock signal according to the first clock signal and transmitting the second clock signal to the slave device via the second connection port by the control module, wherein the control module connects the second connection port to a ground port or a high-level bias port to produce and transmit the second clock signal, wherein the high-level bias port coupled to a voltage source via a pull-up impedance;

(C) monitoring the first connection port, when the first clock signal is switched from a first logic level to a second logic level, the control module controls the first connection port to maintain the second logic level; and (D) stopping controlling the first connection port and returning the first connection port to the first logic level after a time interval by the control module.

8. The controlling method according to claim 7, wherein the time interval that control module controls the first connection port to maintain the second logic level is a predetermined duration.

9. The controlling method according to claim 7, wherein the control module makes the second connection port output a first logic signal or a second logic signal as the second clock signal in the step (B).

10. The controlling method according to claim 7, wherein the control module sets the first connection port as an output port that outputs a second logic signal to maintain the second logic level in the step (C).

11. The controlling method according to claim 7, wherein the control module connects the first connection port to a ground port or a high-level bias port to maintain the second logic level in the step (C), wherein the high- level bias port coupled to a DC voltage source via a pull-up impedance.

12. The controlling method according to claim 7, further comprising steps of:

(E) connecting the second connection port with the ground port to produce a logic low-level signal of the second clock signal correspondingly by the control module, when the first logic level is a logic high level and the second logic level is a logic low level;

(F) switching the connection of the second connection port from the ground port to the high-level bias port by the control module ; and (E) stopping controlling the first connection port by the control module, when the second connection port returns to the logic high level from the logic low level.

* * * * *